United States Patent
Kuroda et al.

[11] Patent Number: 5,892,882
[45] Date of Patent: *Apr. 6, 1999

[54] MOVING PICTURE DECODING DEVICE HAVING A COMPRESSED PICTURE DATA MEMORY

[75] Inventors: Kazuo Kuroda; Takashi Okano, both of Tokorozawa, Japan

[73] Assignee: Pioneer Electronic Corporation, Tokyo-to, Japan

[*] Notice: This patent issued on a continued prosecution application filed under 37 CFR 1.53(d), and is subject to the twenty year patent term provisions of 35 U.S.C. 154(a)(2).

[21] Appl. No.: 867,981

[22] Filed: Jun. 3, 1997

Related U.S. Application Data

[63] Continuation of Ser. No. 408,407, Mar. 22, 1995, abandoned.

[30] Foreign Application Priority Data

Mar. 23, 1994 [JP] Japan .................................. 6-051867

[51] Int. Cl.$^6$ .................................................. H04N 5/783
[52] U.S. Cl. ............................................. 386/68; 386/111
[58] Field of Search ............................... 386/68–82, 109, 386/111–112, 6–8, 33; H04N 5/76, 5/92, 9/79, 5/783

[56] References Cited

U.S. PATENT DOCUMENTS

| | | | |
|---|---|---|---|
| 5,282,049 | 1/1994 | Hatakenaka | 358/335 |
| 5,428,393 | 6/1995 | Enokida | 386/111 |
| 5,461,486 | 10/1995 | Uchida | 358/335 |
| 5,499,144 | 3/1996 | Inoue et al. | 386/78 |
| 5,510,899 | 4/1996 | Kim | 358/335 |
| 5,532,837 | 7/1996 | Ootaka et al. | 386/112 |
| 5,537,215 | 7/1996 | Niimura et al. | 358/335 |
| 5,576,902 | 11/1996 | Lane et al. | 386/109 |
| 5,619,338 | 4/1997 | Nakai et al. | 386/109 |
| 5,631,742 | 5/1997 | Shimoda | 386/109 |

*Primary Examiner*—Thai Tran
*Attorney, Agent, or Firm*—Young & Thompson

[57] ABSTRACT

A moving picture decoding device includes: unit for successively receiving compressed digital picture data in a forward reproduction order; unit for constantly storing the compressed picture data corresponding to a predetermined reproduction time period from a picture currently reproduced; unit for producing reproduction pictures including intermediate pictures, in time, of the compressed picture data by picture predictions using the compressed picture data stored in the storing unit; unit for designating output timings of the reproduction pictures; and unit for successively outputting the reproduction pictures at the output timings designated by the designating unit so as to form moving picture. When reverse order reproduction is instructed, the producing unit produces the reproduction pictures in an order reverse to the forward reproduction order and the outputting unit outputs the reproduction pictures in the reverse order.

5 Claims, 5 Drawing Sheets

MOVING PICTURE DECODING DEVICE HAVING A COMPRESSED PICTURE DATA MEMORY

This application is a continuation of application Ser. No. 08/408,407, filed Mar. 22, 1995, now abandoned.

BACKGROUND OF THE INVENTION

1. Field of the Invention

This invention relates to a recently proposed moving picture coding system for storage media which handles digital moving picture, and more particularly to a technique of decoding and reproducing moving picture for special reproduction mode such as reverse reproduction.

2. Description of the Related Art

Recently, various systems for compressing and expanding digital moving picture have been proposed in relation with development of multi-media technique. Digital moving picture compressed by those techniques are expanded (decoded or restored) by conducting interpolation on plural original frame pictures and predicting movement of picture to produce predictive picture, thereby compensating for deficiency in information quantity of original pictures. Particularly, a system proposed in MPEG (Moving Picture Coding Experts Group) which is an international standardization conference of moving picture coding for storage media (hereinafter referred to as "MPEG system") is standardized in consideration of special mode reproduction such as random access or reverse reproduction.

Generally, in moving picture, contents of successive frame pictures are analogous to each other. Taking this into consideration, the moving picture coding technique produces intermediate picture between original pictures by interpolation. The MPEG system also relates to the interpolation technique. In the following, description will be given by taking the MPEG system as representative of such compressing and expanding systems of digital moving picture.

The moving picture coding system for storage media utilizes random-accessible media such as CD-ROM as the storage media. Namely, compressed data of original pictures are recorded on such a storage media. A decoding device of the coded moving picture reads out the compressed data of original pictures from the storage media and carries out digital signal processing including interpolation for producing intermediate pictures between the original pictures. Then, the device stores the interpolated (predicted) pictures in a memory, and outputs the stored pictures in succession as moving picture. Data structure of MPEG system is of hierarchical structure, and includes video-sequence stage, GOP (Group Of Picture) stage which can be individually reproduced, picture stage for predicting picture information including luminance and color differences, slice stage of scanning order, macro-block stage of luminance and color difference blocks of right-left and up-down directions, block stage including 8-lines×8-pixels of luminance and color differences. The decoding device performs prediction of picture, from the compressed pictures read out from the storage medium, utilizing Motion Compensation (MC) and Discrete Cosine Transform (DCT) between frame pictures having periodical intervals, and produces predictive pictures. Thus, the coding device stores decoded pictures by GOP units in a memory device in normal order, and then outputs them.

In order to demonstrate concept of predictive pictures, prediction of picture will be described below. FIG. 1 is a diagram illustrating pictures including predictive pictures in bit-stream of MPEG system. FIG. 1 shows frame pictures, and each of the frames corresponds to a picture stage in the data structure. Picture represented by the reference I is I-picture (Intra-coded picture) which constitutes a single picture by itself. Picture represented by the reference P is P-picture (predictive-coded picture) which is a predictive picture produced by prediction utilizing I-picture and other P-picture of past in reproduction sequence. Picture represented by the reference B is B-picture (Bidirectionally predictive-coded picture) which is produced by prediction utilizing not only I-picture and P-picture of past in reproduction sequence but I-picture and P-picture of future. The pictures shown in FIG. 1 constitute GOP stage. The pictures shown in FIG. 1 are decoded and produced by predictions in the order of P1, P2, P3, . . . , P6. Namely, P-pictures are firstly produced using I-pictures and P-pictures by steps of P1 and P2, and then B-pictures are produced using the I-pictures and P-pictures by steps P3, P4, . . . , P6. In this manner, pictures in a GOP are produced. Then, the decoding device stores the pictures thus produced, and reads them out in normal order. Such a technique is disclosed in Japanese Patent Application Laid-Open No. 5-176694.

On the other hand, when reverse reproduction is needed, the pictures of a GOP are produced and stored in the same manner, and then reproduced in reversed order. However, in order to carry out reverse reproduction in this manner, the decoding device should have memory of large capacity, which is relatively expensive. Namely, the decoding device produces plural pictures from one I-picture to next I-picture by GOP units, and stores all of the pictures in the memory. Then, the device reads out and displays the stored pictures one by one in an order reverse to the normal reproduction order. Therefore, the device is required to store the predicted, non-compressed pictures for many frames. In order to achieve slow reverse reproduction (reverse reproduction slower than normal speed), frame memory having storage capacity of at least 15 frames is required. Since approximately 2M bits of storage capacity is necessary for storing picture of one frame, the device should have large memory having capacity of 30M bits (for 15 frames). In this view, it is impossible, in practice, to achieve reverse reproduction by device of reasonable cost. In addition, storage of all frame pictures in GOP requires long period of time. However, in the field of digital moving picture compressing and expanding technique in which it is expected that special reproduction such as random-accessing, high-speed reproduction or reverse reproduction is readily and rapidly carried out, it is not preferable that storage of pictures takes such a long time.

SUMMARY OF THE INVENTION

It is an object of the present invention to provide a moving picture decoding device capable of performing reverse reproduction rapidly using memory of small capacity.

According to one aspect of the present invention, there is provided a moving picture decoding device including: unit for successively receiving compressed digital picture data; unit for storing the compressed picture data of a predetermined quantity; unit for producing reproduction pictures from the compressed picture data stored in the storing unit by picture prediction; unit for designating output timings of the reproduction pictures; and unit for successively outputting the reproduction pictures at the output timings designated by the designating unit so as to form moving picture, wherein the producing unit produces the reproduction pictures in a special order according to a special reproduction and the designating unit designates the output timings according to the special reproduction, when the special reproduction is instructed.

According to the moving picture decoding device of the present invention, the receiving unit receives compressed picture data from a storage medium such as a CD or the like, and the storing unit stores the compressed picture data successively. The producing unit produces intermediate pictures of the compressed picture data by picture predictions using the compressed picture data stored in the storing unit, so that reproduction pictures to be successively reproduced are prepared. The designating unit determines output timings of the reproduction pictures and the outputting unit outputs the reproduction pictures successively at the output timings so that moving picture is reproduced. When user instructs special reproduction such as reverse reproduction or the like, the producing unit produces the reproduction pictures in an order determined according to the manner of the special reproduction, and outputs the produced reproduction pictures in the order. Thus, special reproduction is carried out. Since storing unit, such as memory, stores not all reproduction pictures but only the compressed picture data, special reproduction can be performed with memory of small capacity.

According to another aspect of the present invention, there is provided a moving picture decoding device including: unit for successively receiving compressed digital picture data in a forward reproduction order; unit for constantly storing the compressed picture data corresponding to a predetermined reproduction time period from a picture currently reproduced; unit for producing reproduction pictures including intermediate pictures, in time, of the compressed picture data by picture predictions using the compressed picture data stored in the storing unit; unit for designating output timings of the reproduction pictures; and unit for successively outputting the reproduction pictures at the output timings designated by the designating unit so as to form moving picture, wherein the producing unit produces the reproduction pictures in an order reverse to the forward reproduction order and the outputting unit outputs the reproduction pictures in the reverse order, when reverse order reproduction is instructed.

According to the moving picture decoding device of the present invention, the receiving unit receives compressed picture data from a storage medium such as a CD or the like in a forward order, i.e., normal reproduction order, and the storing unit stores the compressed picture data corresponding to a predetermined reproducing time period, e.g., for several frames, from a picture being currently reproduced. The producing unit produces intermediate pictures of the compressed picture data by picture predictions using the compressed picture data stored in the storing unit, so that reproduction pictures to be successively reproduced are prepared. The designating unit determines output timings of the reproduction pictures and the outputting unit outputs the reproduction pictures successively at the output timings so that moving picture is reproduced. When user instructs reverse reproduction, the producing unit produces the reproduction pictures in an order reverse to the forward order, and outputs the produced reproduction pictures one after another in the reverse order. Thus, reverse reproduction is carried out. Since storing unit, such as memory, stores not all reproduction pictures but only the compressed picture data, reverse reproduction can be performed with memory of small capacity.

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

A preferred embodiment of the present invention will be described below with reference to the accompanying drawings.

Figure 1:
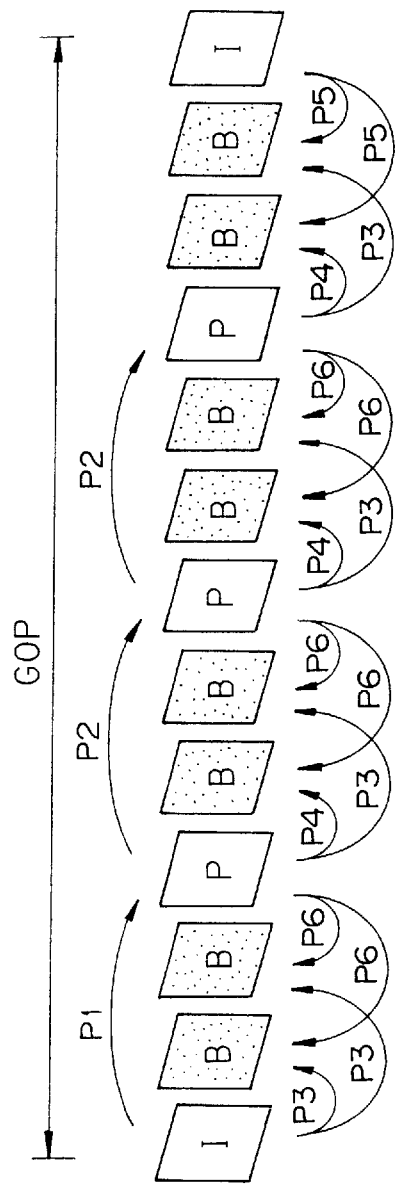
FIG. 1 is a diagram illustrating pictures including predictive pictures in bit-stream of MPEG system.
Figure 2:
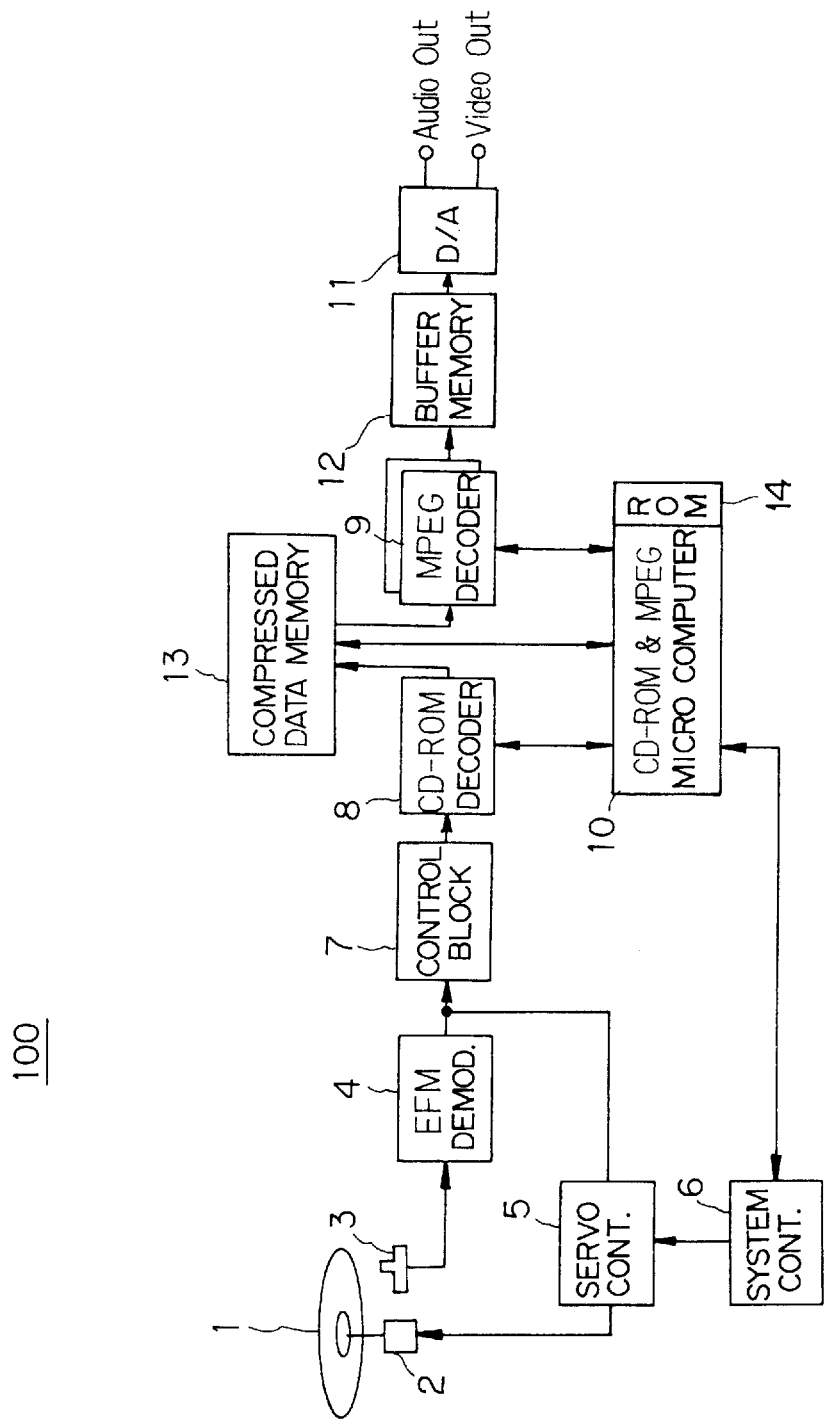
FIG. 2 is a block diagram illustrating a construction of moving picture decoding device according to the present invention.

FIG. 2 is a block diagram illustrating a construction of moving picture decoding device according to the present invention. As illustrated, the moving picture decoding device includes a CD (Compact Disc) 1, a spindle motor 2, an optical pickup 3, an EFM demodulation circuit 4, a servo control circuit 5, a system control circuit 6, a control block 7, a CD-ROM decoder 8, a MPEG decoder 9, a micro-computer 10, a D/A converter 11, a buffer memory 12 and a compressed data memory 13. The CD 1 records compressed data of pictures, and the spindle motor 2 rotates the CD 1. The servo control circuit 5 and the system control circuit 6 control reproduction of picture data from the CD 1, and the pickup 3 reads out picture data from the CD 1 and outputs RF signal. The EFM demodulation circuit 4 conducts EFM demodulation onto the RF signal, and the control block 7 performs error correction based on parity data outputted from the EFM demodulation circuit 4. The CD-ROM decoder 8 decodes compressed picture data and audio data, and the compressed data memory 13 stores compressed data of plural frames within a period from an I-picture to next I-picture (i.e., pictures in a GOP). The MPEG decoder 9 decodes data read-out from the compressed data memory 13 according to MPEG system. The buffer memory 12 temporarily stores decoded picture data, and the D/A converter 11 converts picture and audio data from the buffer memory 12 into analog picture and audio signal. The micro-computer 10 totally controls the whole system. An internal memory of the MPEG decoder 9 may be used as the buffer memory 12. That is, by using MPEG decoder having internal buffer memory, both decoding function and timing adjusting function can be performed by the MPEG decoder 9. A ROM 14 is connected to the micro-computer 10, and the ROM 14 stores information of timings at which the MPEG decoder 9 supplies data to the buffer memory 12.

Figure 3:
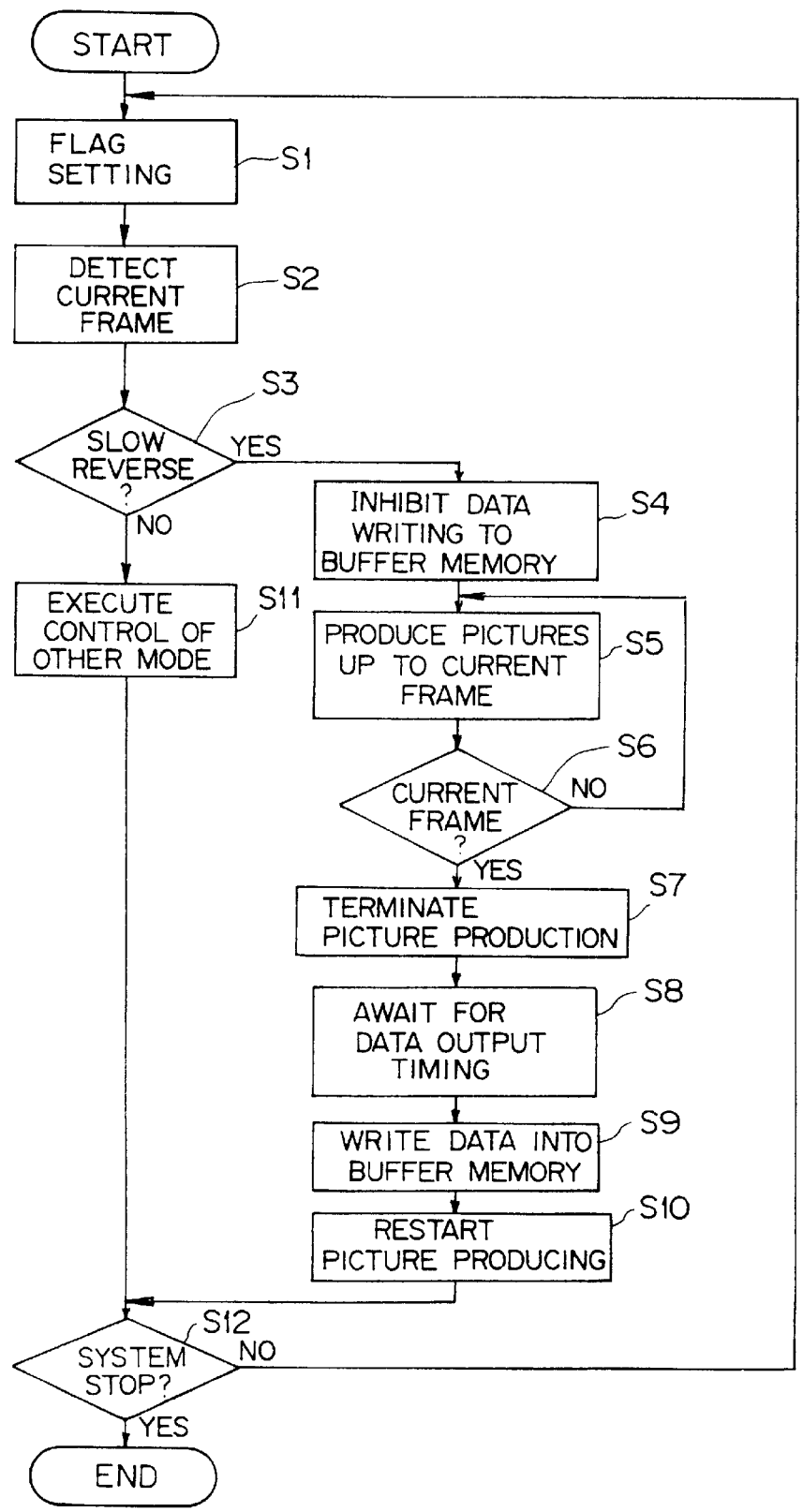
FIG. 3 is a flowchart illustrating an operation of moving picture decoding device of the present invention.
Figure 4:
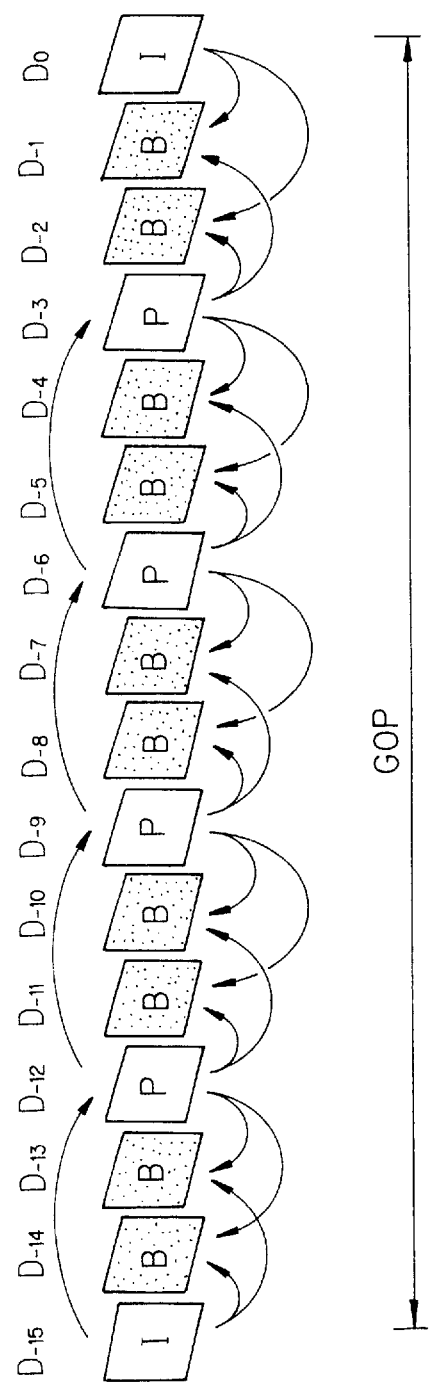
FIG. 4 is a diagram illustrating a manner of producing pictures by the moving picture decoding device of the invention.

Next, an operation of the moving picture decoding device 100 will be described along the flowchart of FIG. 3, with occasional references to FIGS. 4 and 5. Compressed data read out from the CD 1 and decoded by the CD-ROM decoder 9 (generally referred to as "MPEG bit stream") is stored in the compressed data memory 13. In normal reproduction of forward direction, this compressed data is supplied to the MPEG decoder 9, and the MPEG decoder 9 generates predictive pictures. The predictive pictures thus produced are outputted by the D/A converter 11 in a form of analog signal. Therefore, in normal reproduction, the pictures including predictive pictures are displayed on a monitor or the like in forward reproduction order.

Next, operation of reverse reproduction will be described. Now, assuming that user instructs slow reverse reproduction by manipulation of operation panel or the like, the system control circuit 6 supplies a command indicating that special reproduction is instructed to the micro-computer 10. The micro-computer 10 detects and recognizes frame of picture being currently supplied to the MPEG decoder 9, and executes flag setting necessary for special reproduction (step S1). Then, the micro-computer 10 detects frame picture being currently outputted (hereinafter referred to as "current frame") by referring to number of the frame or the like (step S2). In this case, the current frame is $D_0$, as shown in FIGS. 4 and 5. Then, the micro-computer 10 judges whether the special reproduction instructed by the user is slow reverse reproduction or not (step S3), and, if not, executes operation of other reproduction such as high speed reproduction, etc (step S11). If the micro-computer 10 recognizes that the command indicates slow reverse reproduction (step S3: YES, FIG. 5: slow reverse ON), the micro-computer 10 inhibits writing picture data into the buffer memory 12 so as to terminate picture display of normal reproduction mode (step S4). Then, the MPEG decoder 9 starts producing pictures including predictive pictures for at least one GOP (i.e., $D_0$ to $D_{-15}$) from the current frame $D_0$ in reversed order of normal reproduction. Now, assuming that the compressed data memory 13 retains picture data of I-picture $D_{-15}$ and P-pictures $D_{-12}$, $D_{-9}$, $D_{-6}$ and $D_{-3}$, the MPEG decoder 9 produces successive pictures including B-pictures by predictions (step S5). Namely, the MPEG decoder 9 produces B-pictures $D_{-14}$ and $D_{-13}$ using P-picture $D_{-12}$ and I-picture $D_{-15}$, and subsequently produces B-pictures $D_{-11}$ and $D_{-10}$ using P-pictures $D_{-9}$ and $D_{-12}$. In this manner, the MPEG decoder 9 produces pictures $D_{-15}$ to $D_{-1}$. When pictures up to the current frame ($D_0$ in this case) are produced (step S6:YES), production of pictures is terminated (step S7). During the picture production, those pictures are not displayed and the picture of the frame $D_0$ is continuously displayed because data writing into the buffer memory 12 has been inhibited (see. step S4). Subsequently, reverse reproduction is started. The micro-computer 10 determines timings for writing picture data into the buffer memory 12 according to the reverse reproduction in consideration of the time period (reference time period $T_{ref}$) required for changing displayed picture from $D_0$ to $D_{-1}$ (step S8). Namely, the micro-computer 10 sets the interval of outputting the pictures to the time period $T_{ref}$ (see. FIG. 5:picture output timing). When the picture $D_{-1}$ is outputted by the MPEG decoder 9, the micro-computer 10 releases the inhibition of data writing to the buffer memory 12. Thereby, picture $D_{-1}$ is displayed (step S9). Then, the MPEG decoder restarts picture production in order to produce and display next picture (i.e., $D_{-2}$). First, the micro-computer 10 checks whether termination of the system has been instructed or not (step S12), and, if not, repeats steps S1 to S8. Namely, the MPEG decoder 9 produces pictures from $D_{-15}$ up to $D_{-2}$ this time, and displays the picture $D_{-2}$ (step S9). In this manner, steps S1 to S12 are repeated and pictures are displayed one by one in the reversed order $D_{-1}$, $D_{-2}$, . . . , until the picture $D_{-15}$ is displayed. As a result, pictures $D_{-1}$ to $D_{-15}$ are displayed in the reversed order. It should be noted that, in step S6 of each repetitions of steps S1 to S12, current frame is renewed one frame prior. Namely, the current frame is $D_0$ at the start of the reverse reproduction and changes to $D_{-1}$, $D_{-2}$, . . . , $D_{-15}$ at every repetitions of steps S1 to S12.

In the above processing, time periods required for producing pictures up to the current frame $D_{-1}$, $D_{-2}$, . . . are different, respectively. For example, producing P-picture $D_{-3}$ takes shorter period of time than producing B-pictures $D_{-2}$ or $D_{-1}$. However, since the micro-computer 10 controls timings of writing picture data into the buffer memory 12 so that picture data is written in to the buffer memory 12 with a constant interval $T_{ref}$ as described above, the pictures $D_{-1}$ to $D_{-15}$ are displayed with constant time intervals (i.e., at constant speed) in the reverse reproduction. Therefore, slow reverse reproduction is performed naturally for watchers.

Figure 5:
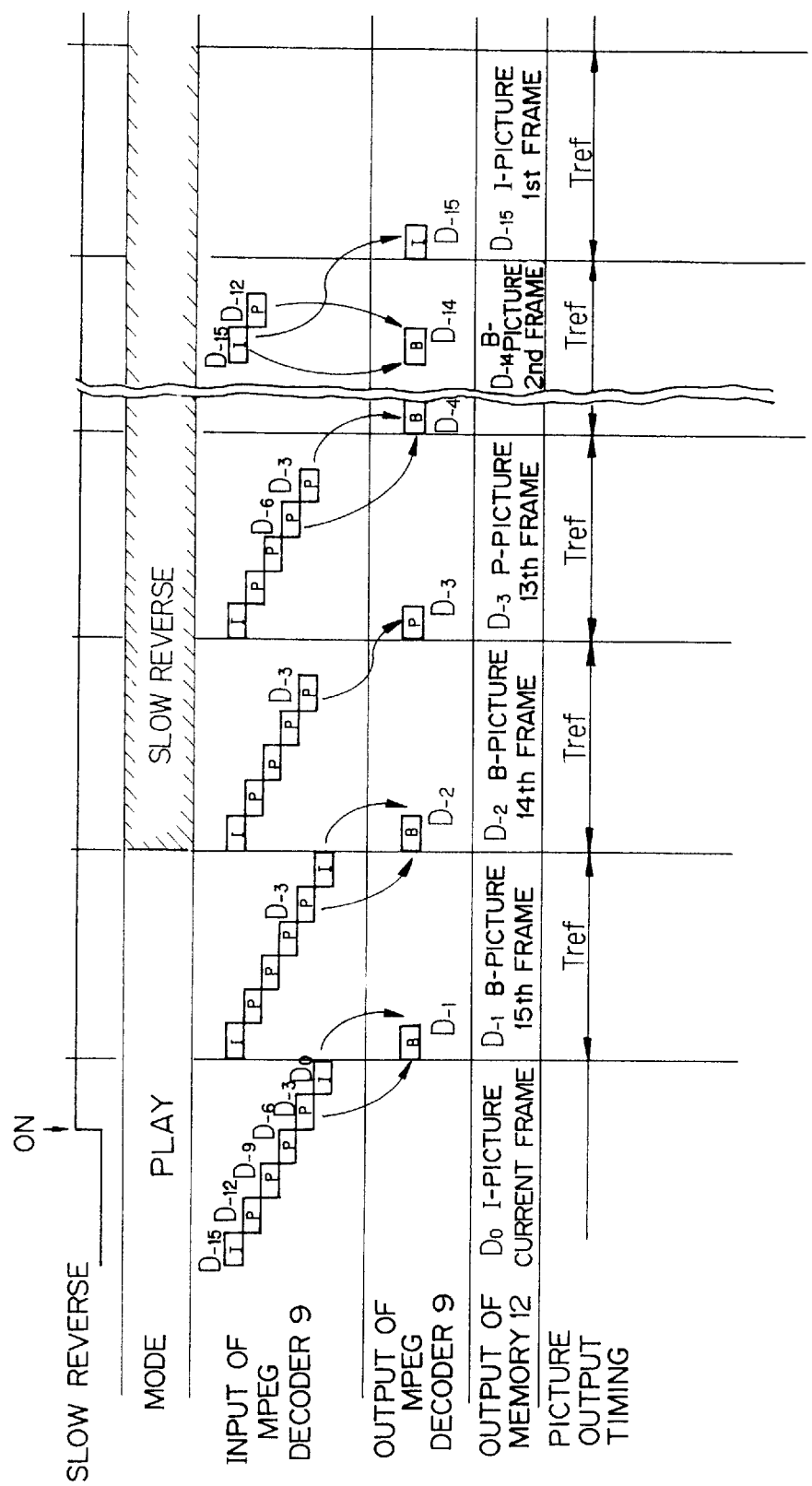
FIG. 5 is a diagram illustrating the operation performed along the flowchart shown in FIG. 3.

FIG. 5 is a diagram illustrating the operation performed along the flowchart described above, with emphasizing input and output data of the MPEG decoder 9. Namely, B-picture data $D_{-1}$ of 15th frame (in normal reproduction order) is produced using picture data $D_{-3}$ and current data $D_0$, and B-picture data $D_{-2}$ of 14th frame is produced using the same data $D_{-3}$ and $D_0$. In this manner, picture data $D_{-1}$ to $D_{-15}$ are produced and displayed in succession. If the slow reverse reproduction is continued after the display of the picture $D_{-15}$ and hence data stored in the compressed data memory 13 becomes insufficient to continue the slow reverse reproduction (e.g., the picture $D_{-15}$ has already been displayed and slow reverse reproduction is further continued), data prior to the picture $D_{-15}$ is read out from the CD 1, and the same operation is repeated. Until user instructs termination of slow reverse reproduction (step S12:YES), the device 100 continues the slow reverse reproduction.

According to the above embodiment, compressed picture data is stored in the compressed data memory and picture data is produced using the stored compressed data when slow reverse reproduction is instructed. Namely, it is unnecessary to store all frame pictures including predictive pictures produced from the compressed pictures, and it is necessary to store only the compressed picture data smaller in data capacity than the predictive pictures. Therefore, memory capacity of the device can be saved. In addition, moving picture can be rapidly reproduced in reverse direction because it is unnecessary to read out respective pictures from memory of large storage capacity.

Modifications:

The present invention is not limited to the above described feature and may be modified in other various forms. In the above described embodiment, frame picture $D_{-1}$ is displayed after successively producing frame pictures $D_{-15}$, $D_{-14}$, . . . , $D_{-2}$. However, when reverse reproduction of higher speed (quick reverse reproduction) is needed, production of B-pictures may be omitted and only P-pictures and I-pictures may be displayed in the manner of $D_{-15}$ (I-picture), $D_{-12}$ (P-picture), $D_{-9}$ (P-picture), $D_{-6}$ (P-picture), $D_{-3}$ (P-picture), thereby quick reverse reproduction can be achieved. In this case, time period required for producing and displaying picture $D_{-1}$ is used as reference interval $T_{ref}$ for displaying each pictures.

In the above described embodiment, reproduction speed of slow reverse reproduction is equal to that of normal reproduction. However, reverse reproduction of slower speed (½, ¼ or ¹⁄₁₆. . . of normal speed) may be performed when data writing interval into the buffer memory 12 designated by the micro-computer 10 is determined longer. Further, using the same technique, reverse reproduction in higher speed (twice, 3 times, . . . of normal speed) may be performed. Further, special reproduction of other type can be achieved using the concept of this invention. Namely, by producing predictive pictures using compressed data stored in the compressed data memory and varying manners and timings of supplying the produced pictures, special reproduction such as display of picture of past reproduction, extra-slow reproduction, stroboscopic reproduction or repetitive reproduction can be carried out. In the above description, CD is used as storage device, however, DAT (Digital Audio Tape) or harddisk can be alternatively used. Further, the compressed data memory 13, provided between the CD-ROM decoder 8 and the MPEG decoder 9 in the above embodiment, may be provided between the control block 7 and the CD-ROM decoder 8.

As described above, according to the present invention, special reproduction of moving picture can be performed using memory of small capacity. In addition, since frame pictures are displayed, in the reverse reproduction, with a constant time intervals, the reverse reproduction can be naturally carried out. Further, by omitting display of B-pictures, quick reverse reproduction can be achieved.

The invention may be embodied on other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning an range of equivalency of the claims are therefore intended to be embraced therein.

What is claimed is:

1. A moving picture decoding device comprising:

means for successively receiving compressed digital picture data in a forward reproduction order;

means for storing the compressed picture data in one GOP (Group of Picture), according to the MPEG system, in which the compressed picture data corresponding to a picture currently reproduced is included, said compressed picture data including an I-picture data, P-picture data and B-picture data;

means for reading out the compressed picture data from said storing means in the forward reproduction order to produce reproduction pictures by picture predictions according to a decoding method of the MPEG system;

means for designating output timings of the reproduction pictures; and means for successively outputting the reproduction pictures at the output timings designated by the designating means so as to form a moving picture, wherein, when a reverse order reproduction is instructed, said reading means reads out necessary compressed data stored in said storing means in the forward reproduction order and produces the reproduction pictures in an order reverse to the forward reproduction order, and said outputting means outputs the reproduction pictures produced by the reading means in the reverse order.

2. The device according to claim 1, wherein said designating means designates the output timings to have constant time intervals therebetween.

3. The device according to claim 1, wherein said outputting means continuously outputs, after the instruction of the reverse order reproduction, a first reproduction picture being reproduced at the time when the reverse order reproduction is instructed until a reproduction picture just prior, in time, to the first reproduction picture is produced and outputted.

4. The device according to claim 1, wherein said outputting means inhibits output of the B-picture data after the reverse order reproduction is instructed.

5. The device according to claim 2, wherein said designating means determines, as the constant time interval, a longest one of time periods required for producing each of the reproduction pictures.

* * * * *